Jan. 14, 1941.   Q. LANDIS ET AL   2,228,632
BEARING GLAND STRUCTURE
Filed June 24, 1938
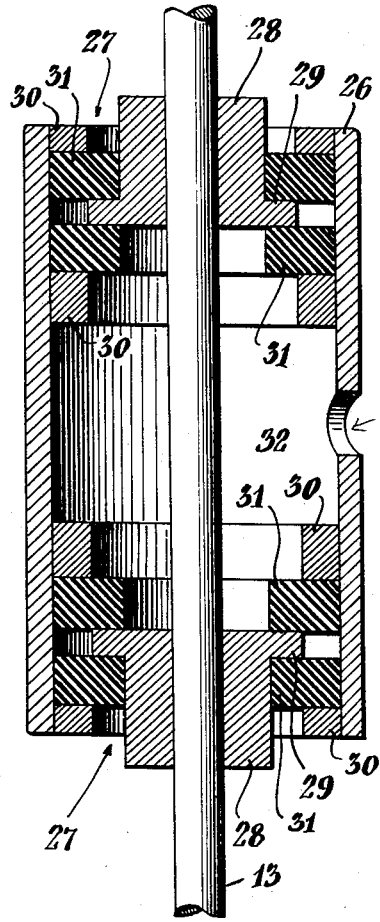
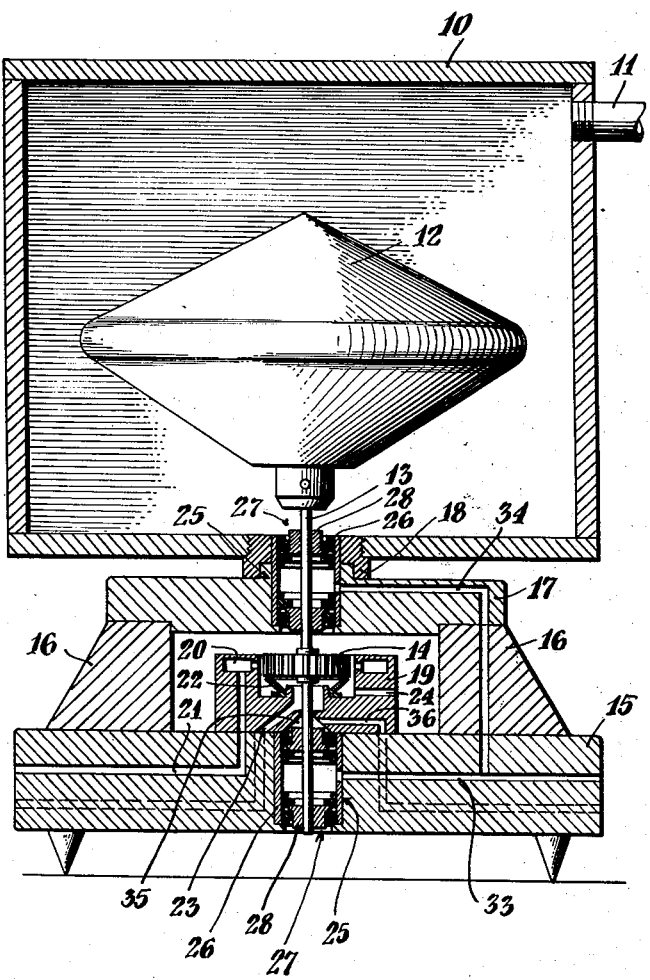
INVENTORS
Quick Landis,
BY Charles Otto Beckmann
Watson, Bristol, Johnson & Leavenworth
ATTORNEYS Patented Jan. 14, 1941

2,228,632

UNITED STATES PATENT OFFICE 2,228,632

BEARING GLAND STRUCTURE

Quick Landis, Bronx, and Charles Otto Beckmann, Brooklyn, N. Y., assignors of seventy-five per cent to Standard Brands Incorporated, New York, N. Y., a corporation of Delaware Application June 24, 1938, Serial No. 215,570

6 Claims. (Cl. 308—145)

The present invention relates to bearing gland structure adapted rotatably to support a shaft and to prevent undue leakage of fluid past the shaft, more particularly to such structure for use in ultracentrifuges especially of the "vacuum" type.

A general object of the invention is the provision of such a bearing gland which is efficient, may be substantially fluid-tight, is easily and economically constructed, and is flexible thus being self-aligning, permitting shaft displacements during vibration so as to eliminate dangerous stresses in a shaft and assisting in damping vibration.

A more specific object of the invention is the provision of bearing gland structure characterized by resilient means preventing metallic contact between a bearing and its support.

A further object is the provision of a bearing gland structure in which a bearing is supported in a substantially fluid-tight manner on the wall of a gland by flexible means whereby displacement of a shaft and its bearing relative to the gland wall is permitted.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawing, in which:

Fig. 1 is a vertical sectional view of an inverted air-driven ultracentrifuge of the vacuum type equipped with bearing gland structures of the present invention; and Fig. 2 is an enlarged longitudinal sectional view of bearing gland structure of the present invention shown in Fig. 1.

The present invention comprises bearing gland structure featured by resilient support of a shaft bearing so as to permit displacement of the shaft and bearing relative to other structure of the gland. The specific embodiment of the invention disclosed in the drawing is particularly adapted for use in the "vacuum" type of ultracentrifuge.

In the inverted air-driven ultracentrifuge wherein the cell rotor is located above the air turbine it has been found that in starting rotation of the rotor there are two speeds through which it passes at which the rotor may wobble considerably. The first speed depends upon the length and stiffness of the supporting shaft and the dimensions and weight of the rotor and is approximately equal to the period of vibration of the centrifuge when displaced while not spinning. The second speed covers a band of frequencies and has a lesser amplitude than the first. It has been found that the small supporting shaft, usually steel piano wire, in such ultracentrifuges is apt to break if it is run for an appreciable period of time at a resonant speed and this tendency is aggravated by the presence of rigid bushings commonly used in the oil glands. This and other difficulties are substantially eliminated by the present invention which has the further advantage of tending to damp vibration. The bearings are made self-aligning and their supports permit displacement of the shaft during vibration without the production of serious local stresses in the shaft which might result in fracture thereof.

By way of example the invention will be described with reference to the drawing in which like numerals refer to like parts throughout. In Fig. 1 is shown various parts of a "vacuum" type of inverted air-driven ultracentrifuge which is provided with a bearing gland structure of the present invention. In vacuum chamber 10 having an exhausting conduit 11 is located a rotor 12 supported upon a shaft 13 of suitable material, e. g. steel piano wire, usually of a diameter between about 0.0265 and 0.1250 inch. A rotor 14 of an air turbine is mounted upon shaft 13.

Upon a base 15 is mounted blocks 16—16 supporting a plate 17. A collar 18 supports the vacuum chamber 10 upon the plate 17. A block 19 on base 15 is provided with suitable passages 20 to form the driving manifold of the air turbine and are supplied with air under pressure through conduit 21. The block 19 is recessed as shown to receive the turbine rotor 14 and in this recess is seated collar 22. Air under pressure is supplied to the space between the collar 22 and rotor 14 by means of conduit 23 to form an air cushion for supporting the rotating parts. The block 19 is provided with suitable exhaust ports 24—24.

The shaft 13 is shown mounted in the bearing gland structure of the present invention. There are provided two gland units 25, 25 and one mounted in the plate 17 through the collar 18 extending into the vacuum chamber 10 and the other mounted in the base 15. The gland unit mounted in the base 15 is particularly adapted for use with a hollow centrifuge rotor, hollow supporting shaft and means to evacuate the rotor through the shaft. Each gland unit 25 consists of a walled structure or sleeve 26 of suitable material such as brass having mounted in each end thereof in spaced apart relation a bearing gland unit 27. Each bearing gland unit 27 consists of a bearing 28 of suitable material, preferably bronze, although other suitable bearing material such as brass, Babbitt metal, etc., may be used, depending upon the material of the shaft 13. Each bearing 28 is provided with a flange 29.

Within the sleeve 26 is secured by means of rings 30, 30 of brass or other suitable material, a pair of "Duprene" rings 31, 31 between which is snugly fitted the bearing flange 29 with the outer "Duprene" ring 31 snugly fitting the outer surface of the body of the bearing 28 so that a substantially fluid-tight joint is formed. The "Duprene" rings 31—31 are all of a dimension so that they snugly fit within the collar 26 so that with the use of the rings 30—30 substantially fluid-tight joints are obtained. "Duprene" is the trade name for a synthetic rubber made by polymerization of chloroprene. It is resilient and can readily be machined.

The spaced apart bearing gland units 27, 27 provide chambers 32, 32 within the sleeves 26, 26 which are supplied with oil by means of conduits 33 and 34 in the base 15 and the plate 17 respectively. When bearings 28, 28 are properly made only a fraction of a cubic centimeter of oil flows through them per hour. As is well known in the art such a condition readily can be attained by bearings having a lap fit with the shaft. Suitable means may be provided for collecting the escaping oil such as, for example, the space 35 above the lower gland unit 27 communicating with a conduit 36 and it is to be understood that suitable oil collecting cups communicating with drains may be provided for a similar purpose on other ends of the gland units.

Although the bearing gland structure of the present invention has been illustrated in connection with an air-driven ultracentrifuge of the vacuum type it is to be understood that it may be used to advantage in connection with other apparatus or other types of ultracentrifuges, such as suspended rotor air-driven ultracentrifuges of the vacuum type. It is particularly adapted for use in gland units wherein shafts of small dimensions are used to rotate and support relatively large rotors at great rates of speed. The flexible mounting of such structure which reach resonant speeds in operation makes the bearings self-aligning, permits displacement of the shaft relative to gland walls during vibration developed at resonant speeds to avoid development of serious local stresses in the shaft which might result in fracture thereof and further assists in damping vibration. Accordingly the bearing gland structure of the present invention considerably decreases the caution and care required to minimize danger of shaft breakage in operation of ultracentrifuges and other apparatus in which it may be used. It will thus be apparent that the present invention attains the objects set forth above and others which will suggest themselves to one skilled in the art and which may have become apparent in connection with the above description.

Since certain changes may be made in the above constructure and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A bearing gland comprising in combination a walled structure, a pair of bearing supports of resilient material fitted into said structure in a substantially fluid-tight manner, and a pair of shaft bearings each mounted in one of said supports free from contact with said structure and having substantially fluid-tight interfitting engagement with its support; the bearings and their supports defining opposite ends of an oil chamber through which a relatively small, flexible, high speed shaft is adapted to extend in contact with contained oil when rotatably supported by said bearings having substantially a lap fit therewith.

2. A bearing gland unit comprising in combination a sleeve, a pair of bearing supports of resilient material fitted into said sleeve in a substantially fluid-tight manner, each support having a pair of spaced apart inwardly extending flanges, a pair of shaft bearings each mounted in one of said supports free from contact with said sleeve and having a portion fitted within one of said support flanges and a transversely extending flange seated between said support flanges in a substantially fluid-tight manner; the bearings and their supports defining opposite ends of an oil chamber through which a relatively small, flexible, high speed shaft is adapted to extend in contact with contained oil when rotatably supported by said bearings having substantially a lap fit therewith; and means to supply oil to the chamber.

3. A bearing gland unit comprising in combination a sleeve, a pair of spaced apart rings of resilient material fitted into each end of said sleeve in a substantially fluid-tight manner, and a pair of shaft bearings each supported by one pair of said rings free from contact with said sleeve and having a portion fitted within one of the rings and a transversely extending flange seated between the pair of rings in a substantially fluid-tight manner; the bearings and their supports defining opposite ends of an oil chamber through which a relatively small, flexible, high speed shaft is adapted to extend in contact with contained oil when rotatably supported by said bearings having substantially a lap fit therewith.

4. A bearing gland unit comprising in combination a sleeve, a pair of spaced apart rings of resilient material fitted into each end of said sleeve in a substantially fluid-tight manner, means to limit outward movement of the outer rings and inward movement of the inner rings, a pair of shaft bearings each supported by one pair of said rings free from contact with said sleeve and having the body portion thereof fitted within and extending through one of the rings and a transversely extending flange seated between the pair of rings in a substantially fluid-tight manner; the bearings and their supports defining opposite ends of an oil chamber through which a relatively small, flexible, high speed shaft is adapted to extend in contact with contained oil when rotatably supported by the bearings having substantially a lap fit therewith; and an oil inlet communicating with the oil chamber extending through the wall of said sleeve.

5. A substantially fluid-tight bearing gland for a high vacuum chamber comprising in combination a walled structure, and a pair of bearing units mounted in spaced apart relation therein; each of said bearing units comprising a bearing support of resilient material having a substantially fluid-tight fit with the walls of said structure, and a bearing supported free from contact with said structure by said support and having substantially fluid-tight interfitting engagement with the latter; the bearings and their supports defining opposite ends of an oil chamber through which a relatively small, flexible, high speed shaft is adapted to extend in contact with contained oil when rotatably supported by the bearings having substantially a lap fit therewith; and means to supply oil to the chamber.

6. A substantially fluid-tight bearing gland for a high vacuum chamber comprising in combination a walled structure, and a pair of bearing units mounted in spaced apart relation therein; each of said bearing units comprising a bearing support of "Duprene" having a substantially fluid-tight fit with the walls of said structure, and a bearing supported free from contact with said structure by said support and having substantially fluid-tight interfitting engagement with the latter; the bearings and their supports defining opposite ends of an oil chamber through which a relatively small, flexible, high speed shaft is adapted to extend in contact with contained oil when rotatably supported by the bearings having substantially a lap fit therewith; and means to supply oil to the chamber.

QUICK LANDIS.
CHARLES OTTO BECKMANN.